United States Patent
Ohno

(10) Patent No.: US 8,043,669 B2
(45) Date of Patent: Oct. 25, 2011

(54) COMPOSITE MATERIAL AND PROCESS FOR THE PRODUCTION THEREOF

(75) Inventor: Nobuhiro Ohno, Chiyoda-ku (JP)

(73) Assignee: Teijin Chemicals Ltd., Tokyo (JP)

( * ) Notice: Subject to any disclaimer, the term of this patent is extended or adjusted under 35 U.S.C. 154(b) by 0 days.

(21) Appl. No.: 12/312,425

(22) PCT Filed: Nov. 2, 2007

(86) PCT No.: PCT/JP2007/071751
§ 371 (c)(1),
(2), (4) Date: May 8, 2009

(87) PCT Pub. No.: WO2008/056755
PCT Pub. Date: May 15, 2008

(65) Prior Publication Data
US 2010/0059719 A1    Mar. 11, 2010

(30) Foreign Application Priority Data
Nov. 9, 2006   (JP) ................................. 2006-303661

(51) Int. Cl.
    *C23C 16/00*     (2006.01)
    *H01B 1/24*     (2006.01)
    *B05D 5/12*     (2006.01)

(52) U.S. Cl. ........ 427/595; 427/457; 427/487; 427/553; 252/511

(58) Field of Classification Search .......... 252/500; 427/457, 487, 553, 595
See application file for complete search history.

(56) References Cited

U.S. PATENT DOCUMENTS

| | | | | |
|---|---|---|---|---|
| 4,474,906 A | * | 10/1984 | Nakama et al. | 523/205 |
| 4,626,642 A | * | 12/1986 | Wang et al. | 219/759 |
| 5,432,010 A | | 7/1995 | Ko et al. | |
| 2009/0062426 A1 | * | 3/2009 | Shiraki et al. | 523/205 |

FOREIGN PATENT DOCUMENTS

| | | |
|---|---|---|
| JP | 57-56220 | 4/1982 |
| JP | 58-162317 | 9/1983 |
| JP | 59-14924 | 1/1984 |
| JP | 61-286107 | 12/1986 |
| JP | 63-54441 | 3/1988 |

(Continued)

OTHER PUBLICATIONS

Machine translation of JP2005-225993.*
International Search Report dated Dec. 18, 2007 in the International (PCT) Application PCT/JP2007/071751 of which the present application is the U.S. National Stage.

(Continued)

*Primary Examiner* — Mark Kopec
*Assistant Examiner* — Haidung Nguyen
(74) *Attorney, Agent, or Firm* — Wenderoth, Lind & Ponack, L.L.P.

(57) ABSTRACT

This invention is to provide a process for producing a composite material that contains a thermoplastic resin as a matrix and is reinforced with electrically conductive fibers. This invention is to provide a process for producing a composite material that has a small percentage of voids and is excellent in mechanical properties such as flexural strength, flexural modulus.

This invention is a process for producing a composite material, which comprises (1) the step (A) of causing the thermoplastic resin to adhere to the electrically conductive fibers and (2) the step (B) of applying microwave to said fibers to cause them to generate heat and impregnating said fibers with said resin, the composite material comprising a thermoplastic resin and the electrically conductive fibers being impregnated with the thermoplastic resin.

11 Claims, 3 Drawing Sheets

FOREIGN PATENT DOCUMENTS

| | | |
|---|---|---|
| JP | 64-34733 | 2/1989 |
| JP | 5-278126 | 10/1993 |
| JP | 06-320629 | 11/1994 |
| JP | 2001-261978 | 9/2001 |
| JP | 2002-317384 | 10/2002 |
| JP | 2005-225993 | 8/2005 |
| JP | 2005-239843 | 9/2005 |
| WO | WO2006/101269 * | 9/2006 |

OTHER PUBLICATIONS

Form PCT/IB/338 together with International Preliminary Report on Patentability and translation of PCT Written Opinion mailed Jun. 4, 2009 for International (PCT) Application No. PCT/JP2007/071751 of which the present application is the U.S. National Stage.

* cited by examiner

COMPOSITE MATERIAL AND PROCESS FOR THE PRODUCTION THEREOF

TECHNICAL FIELD

This invention relates to a composite material and a process for the production thereof. This invention relates to a process for producing a composite material excellent in strength by impregnating a fiber with a resin by means of microwave-applied heating.

BACKGROUND ART

A fiber-reinforced composite material containing a thermoplastic resin as a matrix (to be sometimes referred to as "FRTP" hereinafter) is widely known. Generally, FRTP is a prepreg obtained by impregnating reinforcement fibers in the form of dispersed pellets, unidirectional pellets, a single strand, a unidirectional sheet (UD sheet), a woven fabric or a non-woven fabric with a resin. A prepreg is processed into a structural member, various parts, etc., by injection molding, press molding, in-mold forming, filament winding molding, etc.

When FRTP is produced, however, the following points are to be noted. That is, since a thermoplastic resin generally has a high viscosity, its adhering amount to fibers is large and it tends to adhere non-uniformly, so that it is difficult to impregnate each one of fibers with a thermoplastic resin. Further, a gas generated by heating a thermoplastic resin is difficult to dissipate to an outside, and the adherence of fibers and a resin is liable to be insufficient.

FIG. 5 shows one example of an apparatus for impregnating a continuous fiber by a melting method using external heating (parenthesized numerals indicate reference numerals in FIG. 5). This apparatus has a vessel (11) containing a molten thermoplastic resin (12), and is constituted to ensure that a continuous fiber bundle (1) is immersed in the vessel (11) to impregnate the continuous fiber bundle (1) with the molten resin (12). In this case, it is arranged that the viscosity of the thermoplastic resin is decreased by heating (external heating) with pinch rollers (14) so that the fiber bundle may be easily impregnated with the thermoplastic resin.

In this method, it is required to increase the temperature of the resin in the vicinity of the fiber for decreasing the viscosity of the resin in the vicinity of the fiber and improving the adherence to the fiber. Since, however, heat in this method is transmitted in the order of the resin→an interface between resin and the fiber→the fiber, it is required to increase the temperature of the entire resin for increasing the temperature of the interface, and as a result, the entire resin comes to be exposed to a high temperature and is thermally deteriorated.

Further, various proposals have been made with regard to a method of improving the adherence of a resin and a fiber and improving the mechanical properties of FRTP. For example, the following proposals are examples.

Patent Document 1 proposes a process for continuously producing a prepreg sheet, which comprises the steps of continuously taking up a fiber bundle while a tension is exerted along a curved surface press-widening the above fiber bundle, drying the thus-press-widened fiber bundle and impregnating the dry fiber bundle with a molten resin. The above process not only overcomes the problem of a residual solvent but also overcomes the insufficiency of press-widening of the fiber bundle in a dry method. In this method, however, it is difficult to control the amount ratio of the resin and the fiber, and it cannot be said that sufficient adherence can be accomplished.

Patent Document 2 discloses a process for producing a prepreg, which comprises impregnating a sheet-shaped continuous carbon fiber widened/opened unidirectionally in parallel with a solution of a resin different from a matrix resin and compatible with the matrix resin and bonding the impregnated carbon fiber without drying to a sheet-shaped resin that is the matrix resin. Since this method uses, as glue, a resin solution compatible with the matrix resin, it has a defect that a residual solvent degrades the performance of a composite material.

Patent Document 3 proposes a method for producing a prepreg, in which a sheet-shaped continuous carbon fiber widened/opened unidirectionally in parallel is pressed to a thermoplastic resin film in a molten state to impregnate the carbon fiber with the thermoplastic resin. This method cannot yet be said to give sufficient adherence.

Patent Document 4 proposes a method for continuously producing a fiber-reinforced plastic, in which a fluid plastic is separated into many flows and the many flows are caused to collide with a fiber material by ejecting them perpendicular to the fiber material. When this method is applied to a thermoplastic resin, the viscosity of a molten thermoplastic resin is too high, so that it is required to prepare a solution or dispersion thereof. It cannot be said, either, that the above method fully overcomes the problem of a residual solvent.

Patent Document 5 discloses a method for producing a prepreg, which comprises removing a sizing agent of a fabric with a solvent in a prepreg containing the fabric as a reinforcing material and the thermoplastic resin as a matrix, then drying the prepreg, stacking a thermoplastic resin film and pressing the resultant set under heat. Even in this method, however, it cannot be said, either, that the adherence of the resin and the fabric to each other is sufficient.

Patent Document 6 discloses a laminate molding method in the stamping forming of a fiber-reinforced prepreg containing polypropylene as a matrix resin, in which an additive for improving a dielectric loss coefficient is incorporated into the matrix resin and the prepreg is heat-melted by means of microwave. In this method, however, the additive in the matrix resin is heated by the microwave, and the fiber and the resin in the vicinity thereof cannot be selectively heated. It is therefore required to heat the entire matrix resin to a high temperature for decreasing the melt-viscosity of the resin close to the fiber to a desired melt-viscosity, so that the entire matrix resin may be thermally deteriorated.

(Patent Document 1) JP-A 57-56220
(Patent Document 2) JP-A 58-162317
(Patent Document 3) JP-A 59-14924
(Patent Document 4) JP-A 61-286107
(Patent Document 5) JP-A 63-54441
(Patent Document 6) JP-A 64-34733

DISCLOSURE OF THE INVENTION

It is an object of this invention to provide a process for producing a composite material that contains a thermoplastic resin as a matrix and that is reinforced with electrically conductive fibers. It is an object of this invention to provide a process for producing a composite material that has a small percentage of voids and that is excellent in mechanical properties such as flexural strength, flexural modulus, etc. It is an object of this invention to provide a process for producing a composite material excellent in adherence of a thermoplastic resin and electrically conductive fibers. It is an object of this invention to provide a process for producing a composite material, in which the molecular weight of a matrix resin is less decreased and the hue thereof is less deteriorated. It is an object of this invention to provide a process for producing a composite material, in which electrically conductive fibers are less damaged.

This invention is based on a finding that when microwave is applied to electrically conductive fibers to heat them in the impregnation of the electrically conductive fibers with a thermoplastic resin, the viscosity of the thermoplastic resin is decreased, so that the above fibers are well impregnated with the thermoplastic resin and that their adherence is improved.

Further, this invention is based on a finding that since the heating by microwave is limited to a local place in the vicinity of an interface between each electrically conductive fiber and the thermoplastic resin, the deterioration of the resin is inhibited as compared with an external heating method in which the entire thermoplastic resin is heated.

Further, it is based on a finding that fibers are less damaged in the non-contact heating by microwave than in a method in which electrically conductive fibers are brought into contact with a heater.

Further, it is based on a finding that when electrically conductive fibers are heated by applying microwave before they are impregnated with a thermoplastic resin, water and impurities adhering to the above fibers can be efficiently removed and the above fibers are well impregnated with the thermoplastic resin.

This invention is a process for producing a composite material formed of electrically conductive fibers and a thermoplastic resin, the electrically conductive fibers being impregnated with the thermoplastic resin, which comprises (1) the step (A) of causing the thermoplastic resin to adhere to the electrically conductive fibers and (2) the step (B) of applying microwave to said fibers to cause them to generate heat and impregnating said fibers with said resin.

In the step (A), preferably, the thermoplastic resin in a molten state or in the form of a powder is caused to adhere. In the step (B), preferably, a heating means is provided together to impregnate the fibers with said resin. Before the step (A), preferably, there is included the step (F-1) of opening the electrically conductive fibers. Before the step (A), preferably, there is included the step (F-2) of heating the electrically conductive fibers by applying microwave to said fibers. After the step (B), preferably, there is included the step (D) of pressing said resin. After the step (B), preferably, there is included the step (C) of cooling the molten resin to solidness. The electrically conductive fibers are preferably carbon fibers. The electrically conductive fibers have a form selected from the group consisting of a strand, a unidirectional (UD) sheet, a woven fabric and a non-woven fabric. The thermoplastic resin is preferably an aromatic polycarbonate resin. The aromatic polycarbonate resin preferably has a melt volume rate (MVR value) of 70 cm$^3$/10 minutes or less.

This invention includes a composite material containing electrically conductive fibers and a thermoplastic resin and having a void percentage of 2.6% or less. Preferably, the electrically conductive fibers are substantially free of breaks.

EXPLANATIONS OF LETTERS OR NOTATIONS

Figure 1:
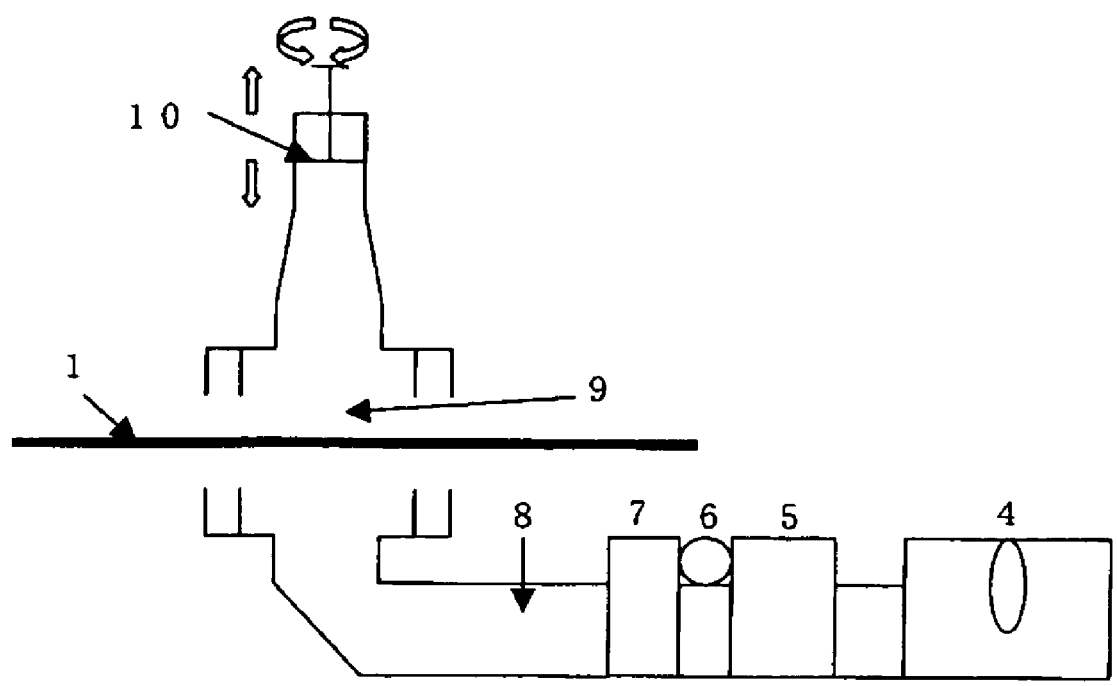
FIG. 1 is a schematic drawing of a microwave furnace.

1. Continuous fiber bundle of electrically conductive fibers
2. Guide roller
3. Fiber-opening apparatus
4. Microwave generator (magnetron)
5. Microwave isolator
6. Power monitor
7. EH tuner
8. Waveguide
9. Oven for heating based on microwave induction
10. Reflection adjustable plate (plunger)
11. Vessel
12. Thermoplastic resin
13. Microwave inducing furnace
14. Pinch roller
15. Twisting take-up machine roller
16. Cutter
17. Cooling portion

BEST MODE FOR CARRYING OUT THE INVENTION

<Process for Producing Composite Material>
This invention is a process for producing a composite material formed of electrically conductive fibers and a thermoplastic resin, the electrically conductive fibers being impregnated with the thermoplastic resin.
(Electrically Conductive Fibers)
In this invention, preferably, the electrically conductive fibers (to be sometimes referred to as "fibers" hereinafter) are fibers having a specific resistance of approximately 0.5Ω/cm to 1.0×10$^{-6}$Ω/cm. Examples thereof include carbon fibers, metal-coated fibers, metal oxide fibers, metal-oxide-coated fibers, metal fibers, etc. Of these, carbon fibers are preferred since they have excellent strength and a light weight.

The electrically conductive fibers preferably have a diameter of 6 to 8 μm each. The electrically conductive fibers are preferably a continuous fiber.

The electrically conductive fibers preferably have a form selected from the group consisting of a strand, a unidirectional (UD) sheet, a woven fabric and a non-woven fabric.

The strand is preferably a bundle of 11,000 to 25,000 fibers having a diameter of 6 to 8 μm each.
(Thermoplastic Resin)
In this invention, the thermoplastic resin (to be sometimes referred to as "resin" hereinafter) includes an aromatic polycarbonate resin, an aromatic polyester resin, an aliphatic polyester resin, a vinyl-containing thermoplastic resin, a methacrylic resin, a polyamide resin, a polyallylate resin, a polyolefin resin and thermoplastic elastomers such as a thermoplastic polyurethane elastomer, a thermoplastic polyester elastomer, etc. These thermoplastic resins can be used singly or as a mixture of two or more of them depending upon purposes. Of these, an aromatic polycarbonate resin is preferred in that it is excellent in heat resistance and has sufficient tenacity and strength and that it is excellently dissolved in a solvent.

In addition to bisphenol A type polycarbonate that is generally used, the aromatic polycarbonate resin may be any one of various highly heat-resistant or low water-absorption aromatic polycarbonate resins obtained by polymerization using other dihydric phenols.

The aromatic polycarbonate resin may be an aromatic polycarbonate resin that is produced by any production method, and when interfacial polycondensation is employed, monohydric phenols are generally used as a terminal stopper. The aromatic polycarbonate resin may be also a branched polycarbonate resin obtained by polymerization of trifunctional phenols. Further, it may be a copolymerization carbonate obtained by copolymerizing an aliphatic dicarboxylic acid and an aromatic dicarboxylic acid or a dihydric aliphatic or alicyclic alcohol.

The viscosity average molecular weight (M) of the aromatic polycarbonate resin is preferably $1.5 \times 10^4$ to $4.0 \times 10^4$, more preferably $1.5 \times 10^4$ to $3.8 \times 10^4$. The viscosity average molecular weight (M) of the aromatic polycarbonate resin is determined by obtaining a specific viscosity ($\eta_{sp}$) from a solution of 0.7 g of a polycarbonate resin in 100 ml of methylene chloride at 20° C. and inserting the specific viscosity in the following equation.

$$\eta_{sp}/c = [\eta] + 0.45 \times [\eta]^2 c \text{ (in which } [\eta] \text{ is an intrinsic viscosity)}$$

$$[\eta] = 1.23 \times 10^{-4} M^{0.83}$$

$$c = 0.7$$

Further, the melt volume rate (MVR value) of the aromatic polycarbonate resin is preferably 70 cm$^3$/10 minutes or less, more preferably 20 cm$^3$/10 minutes or less, most preferably 10 cm$^3$/10 minutes or less. The above melt volume rate (MVR value) refers to a value obtained by measurement according to ISO1133 standard at 300° C. under a load of 1.2 kg.

This invention is a process for producing a composite material, which comprises the step (A) and the step (B). Each step will be further explained in detail.

(Adherence: Step (A))

The step (A) is a step of causing a thermoplastic resin to adhere to electrically conductive fibers. The resin is preferably brought into a molten state by heating, or into the form of easily mixable fibers, a powder or a film and caused to adhere to the fiber surface. Specifically, the step (A) can be carried out by immersing electrically conductive fibers in a vessel containing a molten resin. In the step (A), preferably, a thermoplastic resin in a molten state or in the form of a powder is caused to adhere.

(Microwave Application: Step (B))

The step (B) is a step of applying microwave to fibers having the resin adhering thereto to cause the fibers to generate heat and thereby impregnating the fibers with the resin. When the fibers are heated, the viscosity of the resin is decreased and the fibers are easily impregnated with the resin. The electrically conductive fibers have various concave and convex forms on their surfaces, and when the fibers are brought into contact with the low-viscosity resin, an anchor effect produced by the concave and convex forms can be used for their adherence. By microwave application, the fibers are more uniformly and strongly coated and impregnated with the resin.

The microwave refers to microwaves including millimeter waves that are electric waves having a wavelength of 10 cm or less. This microwave causes the electrically conductive fibers typified by carbon fibers to generate heat, and the thermoplastic resin that is temperature-increased can be melted. The microwave is used an excellent internal heating means in this invention.

The surface temperature of the fibers is preferably 250° C. to 480° C., more preferably 250° C. to 400° C., still more preferably 300° C. to 350° C. When the fiber temperature is in this range, the fibers can be impregnated with the resin. The time period for which the fibers are caused to generate heat by applying microwave is preferably in the range of 0.1 to 100 seconds, more preferably in the range of 0.2 to 60 seconds. When the above time period is too long, resin in the interface between the resin and the fibers is thermally deteriorated. When it is too short, desired adherence is difficult to obtain.

In the step (B), preferably, the fibers and resin are heated by heating means such as a heater, a heating medium, etc., in addition to the heating by application of microwave.

It is preferred to carry out the step (B) while the fibers having the resin adhering thereto are pressed. The pressing can be carried out with twisting, squeezing, etc. The pressing serves to supply resin to inter-fiber spaces from peripheries of the fibers.

(Opening of Fibers: Step (F-1))

In this invention, preferably, a step (F-1) is carried out before the step (A). The step (F-1) is a step of opening the electrically conductive fibers. A strand of the electrically conductive fibers is a bundle of 12,000 to 24,000 electrically conductive fibers having a diameter of approximately 7 μm each, and when the fibers are not opened broadly, they are not well uniformly impregnated with the resin. The opening of the fibers is preferably carried out by means of a roller or air to ensure that the bundle of the electrically conductive fibers is flattened to constitute 5 to 10 layers.

(Microwave Application: Step (F-2))

In this invention, preferably, a step (F-2) is carried out before the step (A). It is preferred to carry out the step (F-2) after the step (F-1). The step (F-2) is a step of applying microwave to the electrically conductive fibers to heat the fibers. The step (F-2) is a step of heating the fibers to remove water that may constitute voids. When electrically conductive fibers having a low surface temperature and having a large water content are mixed with the resin, voids are liable to be entrained due to the expansion of water, and the resin is liable to be deteriorated by decomposition with hot water. Further, when the electrically conductive fibers are heated by applying microwave, there can be burned out a sizing agent of the fibers that may have a detrimental effect on mechanical properties of a product to be produced.

A conventional method of heating electrically conductive fibers by bringing them into contact with a hot plate has a defect that it damages the fibers, whereas the step (F-2) of applying microwave for heating is non-contact and has no possibility of damaging the fibers.

The heating by microwave is preferably carried out such that the heating temperature is higher than that of the resin temperature. Specifically, when the resin is a molten aromatic polycarbonate resin, the electrically conductive fibers are preferably heated such that they have a surface temperature of 330 to 380° C.

(Pressing: Step (D))

After the step (B), a step (D) may be carried out. The step (D) is a step of pressing the resin. The step (D) is a step of exerting a pressure on the resin having a low viscosity to further proceed with the impregnation of the fibers by using the remaining heat of the heating by the microwave application in the step (B). The fibers may be squeezed or may be twisted with rollers. When the fibers are taken up while twisting them, a pressure is exerted on the fibers and the resin, and the resin is supplied to voids and gas bubbles that occur due to the shrinkage of the resin.

(Cooling: Step (C))

After the step (D), preferably, a step (C) is carried out. The step (C) is a step of cooling a molten resin to solidness. After the production process is through the step (B), there is obtained a composite material of which the resin is cooled to solidness. The cooling may be carried out by allowing the molten resin to cool at room temperature or by forcibly cooling it with a medium.

(Others)

The step (F-1) to the step (C) may be continuous steps using a continuous fiber or may be steps according to a batch method. They are more preferably continuous steps. When the temperature in a furnace can be controlled, the step (F-1) to the step (D) may be carried out in one furnace instead of using a plurality of microwave furnaces. In the step (F-1) to the step (C), the proportion of the thermoplastic resin can be increased by repeating these steps. The step (F-1) to the step (C) can be carried out under reduced pressure in one chamber.

(Composite Material)

The composite material of this invention contains the electrically conductive fibers and the thermoplastic resin and has a void percentage of 2.6% or less. Desirably, the electrically conductive fibers in the composite material are substantially free of breaking.

The electrically conductive fibers and the thermoplastic resin are as already described. The amount of the electrically conductive fibers in the composite material per 100% by weight of the composite material is preferably 3 to 90% by weight, more preferably 5 to 70% by weight, still more preferably 10 to 60% by weight.

The percentage of voids refers to a value obtained by comparing a theoretical specific gravity (A=ac+b(1−c)) of a composite material calculated from a specific gravity (a) of electrically conductive fibers, a specific gravity (b) of a resin and a content (c) of the electrically conductive fibers with a specific gravity (B) for which the composite material is measured, and expressing a proportion of a decrement thereof ((A−B)/A) by weight percentage. It is more preferably 2.5% or less, still more preferably 2% or less.

EXAMPLES

This invention will be explained in detail with reference to Examples hereinafter, while this invention shall not be limited to/by these Examples. Evaluations were conducted with regard to the following properties.

(1) Percentage of Voids

A specific gravity (A=ac+b(1−c)) of a composite material calculated from a specific gravity (a) of electrically conductive fibers, a specific gravity (b) of a resin and a content (c) of the electrically conductive fibers was compared with a specific gravity (B) for which a composite material was measured, and a proportion ((A−B)/A) (weight %) of a decrement of the specific gravity thereof was calculated.

(2) Flexural Strength

A flexural strength (MPa) was measured according to ISO178.

(3) Flexural Modulus

A flexural modulus (MPa) was measured according to ISO178.

(4) Measurement for Molecular Weight Decrement (ΔMv)

Polycarbonate resins were sampled from composite materials produced in Examples by the following method. That is, a composite material was dissolved in methylene chloride, and the resultant solution was filtered to separate it into electrically conductive fibers and a polycarbonate resin. Then, the solution of the polycarbonate resin in the methylene chloride was dried to form a film, whereby the polycarbonate resin was collected. A viscosity average molecular weight thereof was then measured by the method described in the present specification. A value obtained by deducting the above molecular weight from a molecular weight of a polycarbonate resin powder as a raw material was taken as (ΔMv).

(5) Evaluation of Discoloration

Polycarbonate resins were sampled from composite materials produced in Examples in the same manner as in Measurement for a molecular weight decrement. In 90 g of methylene chloride was dissolved 10 g of a polycarbonate resin sampled in the above manner, to prepare a solution, and the solution was placed in a glass container having internal dimensions of a thickness of 10 mm, a width of 36 mm and a depth of 42 mm and measured for a b value by a light transmission method with a color analyzer TC-1800MK-II supplied by Tokyo Denshoku Co., Ltd. A value obtained by deducting a b value obtained by measuring a polycarbonate resin as a raw material in the same manner as above from the above value was taken as a Δb value.

Text Example 1

Study on the Heating of Electrically Conductive Fibers by the Application of Microwave There was designed a microwave furnace for applying and inducing microwave of 2.45 GHz to a bundle (strand) of 12,000 sized electrically conductive fibers having a diameter of 7 μm each. This microwave furnace was modified such that a temperature distribution was observable by thermotracer, studies were made to determine an angle to be formed by microwave in the furnace and the running direction of the fibers, and studies were made to determine the numbers of internal step rings and dimensions of pipes in the outlet and inlet for a fiber bundle for preventing the leak of the microwave, whereby a microwave application apparatus shown in FIG. 1 was made.

Figure 2:
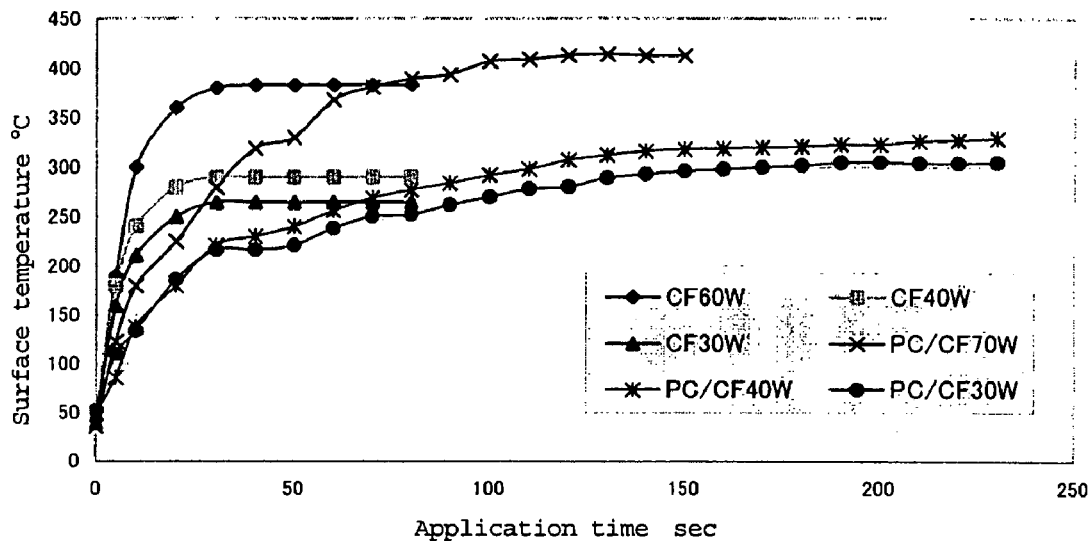
FIG. 2 is a graph showing a relationship between a microwave application time period and a specimen surface temperature when microwave of 30 to 70 W is induced using a microwave furnace shown in FIG. 1 while a strand is fixed. In Table, FWD indicates a generated output of a microwave apparatus, and REW is an output that returns without being absorbed. Further, as CF (carbon fiber), HTA-12K (trade name) supplied by TOHO TENAX Co., Ltd. was used, and as PC (polycarbonate), CM1000 (trade name) supplied by Teijin Chemicals, Ltd. was used.
Figure 3:
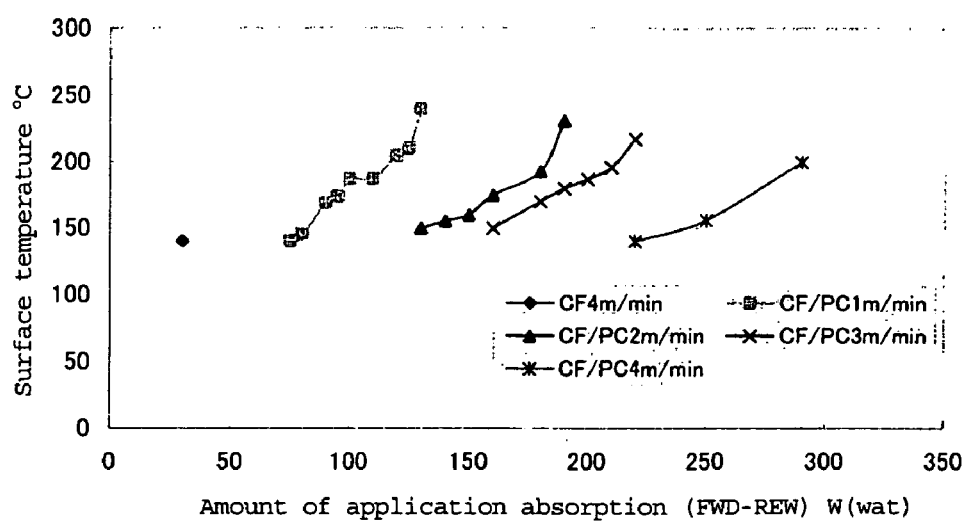
FIG. 3 is a graph showing a relationship between a microwave application time period and a specimen surface temperature when microwave is induced using an apparatus shown in FIG. 1 while a strand is taken up at a speed of 1 to 4 m/min. In Table, FWD indicates an outgoing output of a microwave apparatus, and REW is an output that returns without being absorbed.

Further, since the fiber bundle went through a microwave form once due to a target method in which the bundle went across the microwave form at 90 degrees, reflective wave in the furnace was re-used. That is, for adjusting the reflected wave in the furnace, a reflection adjustable plate (10) was moved, and a stable heating tuning position in which the reflected wave in the furnace could be again applied to a target was determined. Further, the microwave transmission output (FWD) was changed, the reflected light that returned was measured for power (REV), and energies absorbed by a test specimen and temperatures of the test specimen were recorded. As a result, it has been revealed that electrically conductive fibers can perform an efficient increase in temperature by microwave application as shown in FIGS. 2 and 3. In addition, by the use of preliminary-heated aromatic polycarbonate resins having temperatures of 20° C. to 320° C., the heating by microwave was carried out under the same conditions, to show that the temperature gradually decreased without heat generation.

Example 1

As a thermoplastic resin, a polycarbonate resin powder (Panlite L-1225WP, supplied by Teijin Chemicals, Ltd., viscosity average molecular weight: about 22,500, MRV value: 11 cm³/10 minutes) was used.

As electrically conductive fibers, carbon fiber filaments (HTA-12K (trade name) supplied by TOHO TENAX Co., Ltd., number of filaments: 12,000, filament diameter: 7 μm, fineness: 800 g/1,000 m, tensile strength: 3.92 GPa) was used.

Figure 4:
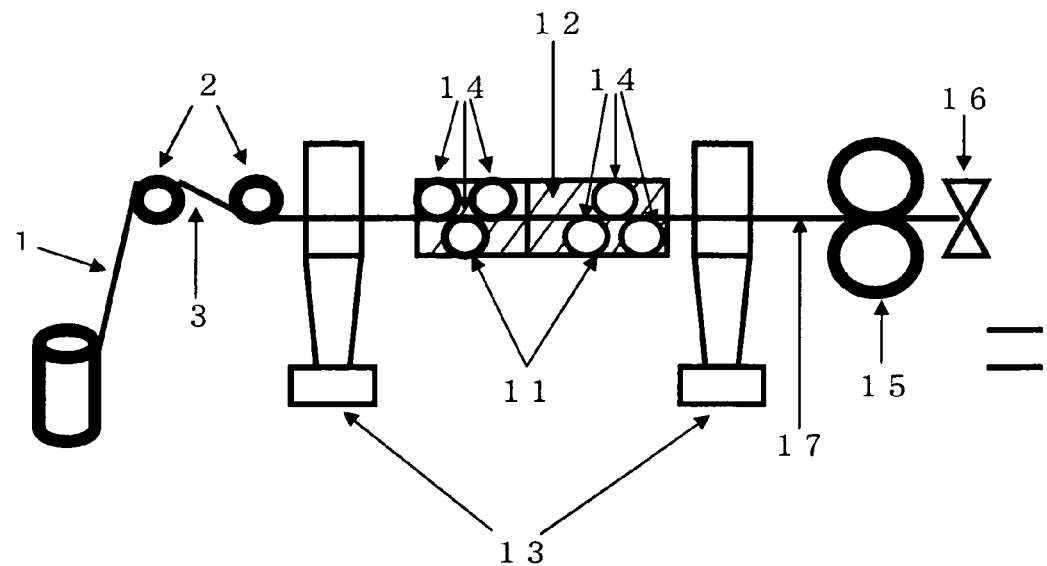
FIG. 4 is a schematic drawing of steps used in Examples.

A composite material was produced by carrying out the following steps with an apparatus shown in FIG. 4. Parenthesized numerals indicate reference numerals in Figure.

(Opening of Fiber: Step (F-1))

The carbon fiber filaments were opened through guide rollers (2). A distance between the guide rollers was 600 mm, and the running speed of the carbon fibers was set at approximately 20 mm/second.

(Application of Microwave: Step (F-2))

The opened carbon fibers were passed through a microwave induction furnace (13) to apply microwave. The microwave was applied for approximately 0.3 second. The power of the microwave and the reflection in the furnace were adjusted by moving a plunger upward and downward such that the surface temperature (measured with an infrared thermotracer) of the carbon fibers in the furnace was 330° C.

(Adhering: Step (A))

Before the temperature of the carbon fibers decreased, the carbon fibers were immersed in a polycarbonate molten resin (12) having a temperature of 300° C. contained in a vessel (11). After the immersion, the carbon fibers were squeezed with pinch rollers (14) and further wrung in a die outlet.

(Application of Microwave: Step (B))

Then, the carbon fibers were passed through a microwave induction furnace (13) positioned in a space between the vessel (11) and a filament twisting take-up machine roller (15), and microwave was applied. A power output and the plunger were adjusted to ensure that the surface temperature measured by an infrared thermotracer became 300° C., and the fibers were heated. The surface temperature was measured in a position located about ⅔ of a distance from an inlet of the furnace to an outlet thereof apart from the inlet of the furnace with a thermotracer (measurement range; approximately 10 mm).

(Pressing: Step (D))

Then, the fibers were continuously taken up with twisting, cooled and cut with a cutter (16). The thus-obtained composite material contained approximately 15 by weight of the carbon fibers per 100% by weight of the composite material.

(Formation of Test Piece)

The thus-obtained composite material was cut into 7 cm long pieces, and these pieces were dried at 120° C. for 6 hours. Ten pieces were arranged in parallel with one another and hot-pressed under pressure for 5 minutes under conditions of 300° C. and 5 kg/cm² to form a test piece having a width of 10 mm, a length of 70 mm and a thickness of 4 mm. The test piece was measured for mechanical strength. Table 1 shows the results.

Example 2

A composite material was prepared in the same manner as in Example 1 except that CM-1000 (trade name) (powder, viscosity average molecular weight: about 16,000, MRV value: 50 cm³/10 minutes) supplied by Teijin Chemicals, Ltd. was used as a polycarbonate resin. It was evaluated in the same manner as in Example 1. Table 1 shows the results.

Example 3

A composite material was prepared in the same manner as in Example 1 except that the fibers were not passed through the microwave induction furnace (13) arranged in a space between a guide roller (2) and the pinch rollers (14). It was evaluated in the same manner as in Example 1. Table 1 shows the results.

Example 4

A composite material was prepared in the same manner as in Example 2 except that the fibers were not passed through the microwave induction furnace (13) arranged in a space between a guide roller (2) and the pinch rollers (14). It was evaluated in the same manner as in Example 2. Table 1 shows the results.

Comparative Example 1

Figure 5:
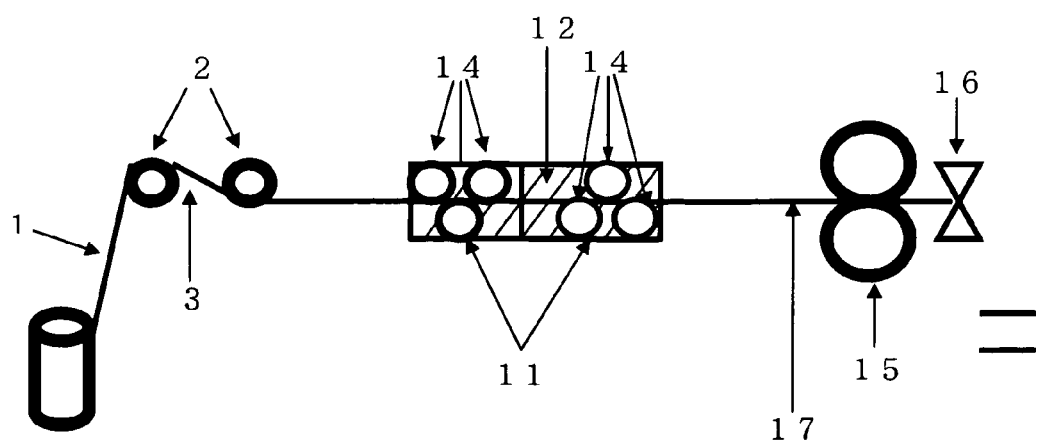
FIG. 5 is a schematic drawing of steps used in Comparative Examples.

A composite material was prepared in the same manner as in Example 1 except that heating with pinch rollers (14) (external heating) was carried out (FIG. 5) in place of the heating with microwave. It was evaluated in the same manner as in Example 3. Table 1 shows the results.

Comparative Example 2

A composite material was prepared in the same manner as in Example 2 except that heating with pinch rollers (14) (external heating) was carried out (FIG. 5) in place of the heating with microwave. It was evaluated in the same manner as in Example 4. Table 1 shows the results.

Comparative Example 3

A composite material was prepared in the same manner as in Comparative Example 1 except that the resin temperature and the surface temperature of the composite material, measured with an infrared thermotracer, after the heating (external heating) with the pinch rollers (14) was adjusted to 380° C. It was evaluated in the same manner as in Comparative Example 1. Table 1 shows the results.

TABLE 1

|  | Unit | Ex. 1 | Ex. 2 | Ex. 3 | Ex. 4 | CEx. 1 | CEx. 2 | CEx. 3 |
|---|---|---|---|---|---|---|---|---|
| Void rate | Wt. % | 1.8 | 1.2 | 2.4 | 1.9 | 4.3 | 2.9 | 1.9 |
| Flexural strength | MPa | 312 | 355 | 316 | 310 | 280 | 290 | 320 |
| Flexural modulus | MPa | 20.0 | 20.0 | 14.5 | 17.0 | 13.8 | 14.0 | 20.0 |
| Decrement of molecular weight | ΔMv | 800 | 500 | 600 | 400 | 700 | 500 | 2000 |
| Yellowing degree | Δb value | 1 | 2 | 1 | 2 | 1 | 1 | 11 |

Ex. = Example,
CEx. = Comparative Example

It is seen from Table 1 that those obtained by the heating with microwave have a low percentage of voids and high strength as compared with those obtained by external heating.

Examples 5-8

Composite materials were prepared in the same manner as in Examples 1 to 4 except that 500FP having an IV value of 0.86, an intermediate viscosity product, supplied by Polyplastic K.K. was used as a polybutylene terephthalate resin in place of the polycarbonate resin and that the temperatures other than the temperature for drying cut pieces of the strand were decreased by 50° C. each. They were evaluated in the same manner as in Examples 1 to 4. Table 2 shows the results.

Comparative Examples 4 and 5

Composite materials were prepared in the same manner as in Comparative Examples 1 and 2 except that 500FP having an IV value of 0.86, an intermediate viscosity product, supplied by Polyplastic K.K. was used as a polybutylene terephthalate resin in place of the polycarbonate resin and that the temperatures other than the temperature for drying cut pieces of the strand were decreased by 50° C. each. They were evaluated in the same manner as in Comparative Examples 1 and 2. Table 2 shows the results.

TABLE 2

|  | Unit | Ex. 5 | Ex. 6 | Ex. 7 | Ex. 8 | CEx. 4 | CEx. 5 |
| --- | --- | --- | --- | --- | --- | --- | --- |
| Percentage of voids | % | 1.3 | 1.1 | 2.0 | 1.5 | 3.0 | 2.6 |
| Flexural strength | MPa | 310 | 340 | 310 | 305 | 300 | 310 |
| Flexural modulus | MPa | 21.0 | 21.5 | 16.0 | 18.0 | 15.0 | 16.0 |

Ex. = Example,
CEx. = Comparative Example

EFFECT OF THE INVENTION

According to the production process of this invention, there can be produced a composite material of which the residual strain and percentage of voids are small and which is excellent in mechanical properties such as flexural strength, flexural modulus, etc. According to the production process of this invention, there can be produced a composite material that is excellent in the adhesion of a matrix resin and electrically conductive fibers. According to the production process of this invention, a decrease in the molecular weight of a matrix resin and a deterioration of a hue can be inhibited. According to the production process of this invention, electrically conductive fibers are heated by applying microwave without a direct contact, so that the damage of the electrically conductive fibers can be suppressed. Further, since it is not any longer necessary to heat a matrix resin, the resin is less deteriorated.

According to the production process of this invention, electrically conductive fibers can be maintained at a high temperature with low energy for a long period of time. Some resins are likely to easily absorb microwave when the resin temperature around the electrically conductive fibers increases, and such resins further decrease in viscosity, so that the electrically conductive fibers can be more easily impregnated with such resins.

Since the composite material of this invention contains the thermoplastic resin as a matrix, it can be subjected to processes of thermal bending, etc., and it can be also subjected to the process of solvent welding by heating with microwave. Therefore, the composite material of the present invention is produced in the form of a plate, and it is subjected to processes of bending in various ways and subjected to processes of cutting, etc., and the thus-shaped material can be insert-molded in a mold. Further, an aggregate of long fibers obtained by cutting a composite material containing continuous fibers can be used in injection molding, injection compression molding, extrusion compression molding and hot shaping.

INDUSTRIAL UTILITY

The composite material of this invention is useful as a molding material, and can be used in the general industrial fields of aerospace, automobiles, and the like.

The invention claimed is:

1. A process for producing a composite material formed of electrically conductive fibers and a thermoplastic resin, the electrically conductive fibers being impregnated with the thermoplastic resin, which comprises:
    (1) step (A) of causing the thermoplastic resin to adhere to the electrically conductive fibers without using a solvent, and
    (2) step (B) of applying microwave to said fibers to cause them to generate heat and impregnating said fibers with said resin.
2. The process of claim 1, wherein the step (A) is practiced by causing the thermoplastic resin in a molten state or in the form of a powder to adhere.
3. The process of claim 1, wherein the step (B) is practiced by using an external heating means in addition to the application of the microwave for the impregnation with said resin.
4. The process of claim 1, wherein the step (A) is preceded by the step (F-1) of opening the electrically conductive fibers.
5. The process of claim 1, wherein the step (A) is preceded by the step (F-2) of applying microwave to the electrically conductive fibers to heat said fibers.
6. The process of claim 1, which comprises a step of pressing said resin after the step (B).
7. The process of claim 1, which comprises a step of cooling the molten resin to solidness after the step (B).
8. The process of claim 1, wherein the electrically conductive fibers are carbon fibers.
9. The process of claim 1, wherein the electrically conductive fibers have a form selected from the group consisting of a strand, a unidirectional (UD) sheet, a woven fabric and a nonwoven fabric.
10. The process of claim 1, wherein the thermoplastic resin is an aromatic polycarbonate resin.
11. The process of claim 10, wherein the aromatic polycarbonate resin has a melt volume rate (MRV value) of 70 cm$^3$/10 minutes or less.

* * * * *